United States Patent [19]
Carini et al.

[11] Patent Number: 5,671,419
[45] Date of Patent: Sep. 23, 1997

[54] INTERPROCEDURAL DATA-FLOW ANALYSIS THAT SUPPORTS RECURSION WHILE ONLY PERFORMING ONE FLOW-SENSITIVE ANALYSIS OF EACH PROCEDURE

[75] Inventors: Paul Robert Carini, Fairfield County, Conn.; Michael George Burke, Westchester County; Michael James Hind, Ulster County, both of N.Y.

[73] Assignee: International Business Machines Corporation, Armonk, N.Y.

[21] Appl. No.: 490,879

[22] Filed: Jun. 15, 1995

[51] Int. Cl.⁶ ............................................. G06F 9/44
[52] U.S. Cl. ............................................. 395/709
[58] Field of Search ............................... 395/709

[56] References Cited

U.S. PATENT DOCUMENTS

| | | | |
|---|---|---|---|
| 5,428,793 | 6/1995 | Odnert et al. | 395/709 |
| 5,457,799 | 10/1995 | Srivastava | 395/709 |
| 5,485,616 | 1/1996 | Burke et al. | 395/709 |
| 5,535,394 | 7/1996 | Burke et al. | 395/709 |
| 5,539,907 | 7/1996 | Srivastava | 395/705 |
| 5,555,417 | 9/1996 | Odnert et al. | 395/709 |

*Primary Examiner*—Kevin A. Kriess
*Assistant Examiner*—John I. Chavis
*Attorney, Agent, or Firm*—Whitham, Curtis, Whitham & McGinn; Louis J. Percello

[57] ABSTRACT

A computer implemented method performs flow-sensitive interprocedural data flow analysis without iteration for a class of interprocedural problems. The accuracy of the solution can approach the iterative result without the compile time cost. For interprocedural constant propagation (ICP), this method is more effective than existing methods and costs about the same compilation time. For flow-sensitive ICP over a program call graph (PCG), the method supports recursion while only performing one flow-sensitive analysis of each routine. If the PCG has cycles, a flow-insensitive solution is precomputed for constant propagation. During the flow-sensitive computation, the flow-insensitive result is used for a back edge. This permits a flow-sensitive solution to be obtained in one forward traversal of the PCG. This method can also be used to compute returned constants with one reverse traversal of the PCG. For flow-sensitive USE over a program call graph (PCG), the method supports recursion while only performing one flow-sensitive analysis of each routine. If the PCG has cycles, a flow-insensitive solution for a reference set (REF) is precomputed. During the flow-sensitive USE computation, the flow-insensitive REF solution is used for a back edge. This permits a flow-sensitive USE solution to be obtained in one reverse traversal of the PCG.

5 Claims, 8 Drawing Sheets

INTERPROCEDURAL DATA-FLOW ANALYSIS THAT SUPPORTS RECURSION WHILE ONLY PERFORMING ONE FLOW-SENSITIVE ANALYSIS OF EACH PROCEDURE

CROSS-REFERENCE TO RELATED APPLICATIONS

This application is related in subject matter to applications Ser. No. 08/135,199 filed Oct. 12, 1993, now U.S. Pat. No. 5,485,616, by M. Burke et al. and Ser. No. 08/139,484 filed Oct. 20, 1993, now U.S. Pat. No. 5,535,394, by M. Burke et al., which applications are assigned to a common assignee with this application. The disclosures in applications Ser. Nos. 08/135,199 and 08/139,484 are incorporated herein by reference.

DESCRIPTION

BACKGROUND OF THE INVENTION

1. Field of the Invention

The present invention generally relates to a system and method for efficiently handling compiler optimization problems and, more particularly, to a system and method for computing flow-sensitive interprocedural constants that support recursion while only performing one flow-sensitive analysis of each procedure, and to a system and method for computing upward exposed use (USE) that supports recursion while only performing one flow-sensitive analysis of each procedure.

2. Background Description

Figure 1:
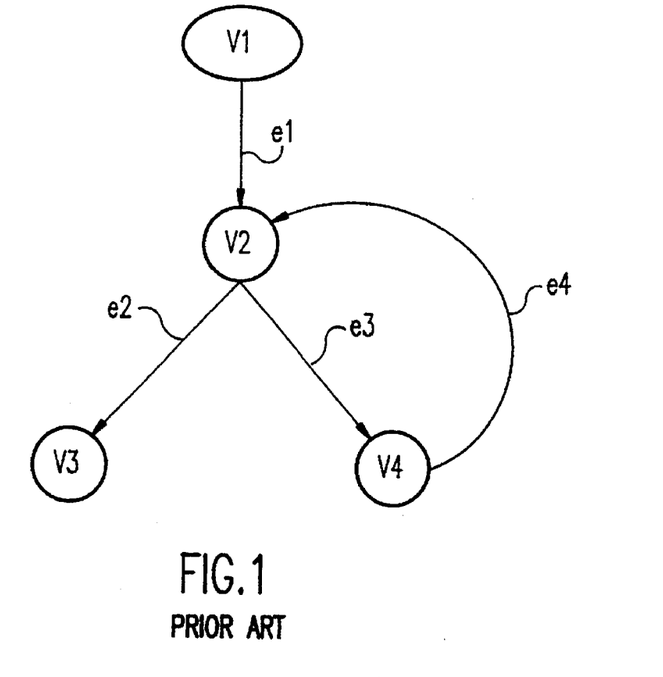
FIG. 1 is a prior art example of a flow graph.
Figure 2:
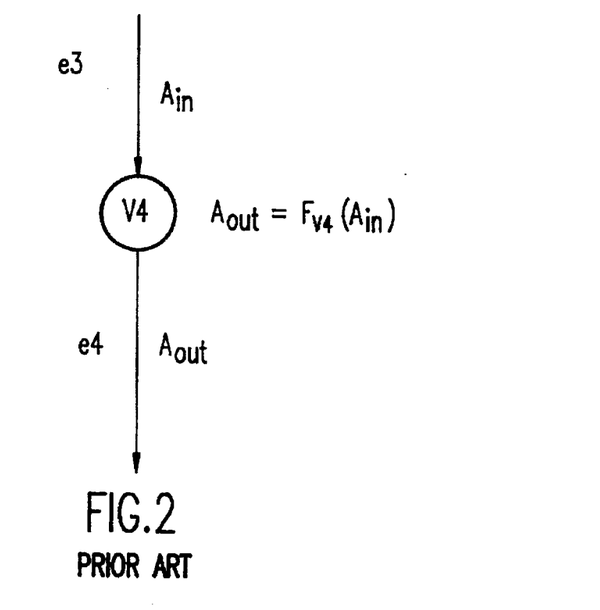
FIG. 2 is a prior art example of a transfer function.

Optimizing and parallelizing compilers perform data flow analysis to insure the correctness of their program transformations. Software development environments also utilize data flow analysis. The input to data flow analysis is a data flow framework as described in Marlowe, *Data Flow Analysis and Incremental Iteration*, Rutgers University (October 1989). The data flow framework includes a flow graph and a formal basis for describing the behavior and interaction of flow graph nodes (FIG. 1). The behavior of each node is formalized by its transfer function (FIG. 2), which describes how a node affects the solution as a function of the behavior of other nodes. When considered as a whole, the node transfer functions present a set of simultaneous equations, whose maximum fixed point (MFP) global evaluation provides the best computable solution at all edges or nodes of the flow graph. In other words, all other correct solutions are either incompatible or not as precise.

A data flow framework D is defined in terms of three components. That is, D=<FG, L,F>, where a flow graph FG=(V,E,r) is a finite set E of edges that includes a distinguished entry node r (shown as node V1 in FIG. 1,), and a finite set E of edges (shown as e1, e2, e3, and e4 in FIG. 1). An edge is an ordered pair (v,w) of nodes; v is the source of the edge and w its target. For example, in FIG. 1, V1, V2, V3, and V4 are nodes with V1 being the start node r. The set of edges, E, comprise e1, e2, e3, and e4. The source of e2 is V2 and its target is V3. The edges are designated by their respective ordered pair of source and target nodes, i.e., (v,w), therefore, e1=(V1, V2); e2=(V2, V3); e3=(V2, V4); and e4=(V4, V2). Where the edge (v,w) is in E, we say that v is a predecessor of w and w a successor of v. For example, in FIG. 1, V2 is a predecessor of V3 and of V4, and also a successor of V4. A sequence of edges (V1,V2),(V2,V3), . . ., (V(n−1),Vn) in FG is a path from V1 to Vn. For example, in FIG. 1, e1, e2 is a path from V1 to V3 and e3, e4, e2 is a path from V2 to V3. If there is a path from Vi to Vj, we say that Vi reaches Vj or that Vj is reachable from Vi. Every node in FG is reachable from r, and r is not the target node of any edge in E. A cycle is a path for which V1=Vn. for example, in FIG. 1, the path e3, e4 forms a cycle. In the presence of flow graph cycles, forward topological order is defined by the removal of back edges. A back edge, as defined by Alfred V. Aho, Ravi Sethi and Jeffrey D. Ullman, Compilers: *Principles, Techniques, and Tools*, published by Addison-Wesley Publishing Co. (1986), at pages 602–604, are edges whose heads (targets) dominate their tails (sources). In FIG. 1, V2 is the head and V4 is the tail of edge e4, and the head (target) V2 dominates the tail (source) V4. Thus, e4 is a back edge.

A "meet semilattice" is a set of elements and a partial ordering of those elements which is defined by a "meet" ($\cap$) operator. More specifically, the meet semilattice L=<A, TOP, BOTTOM, <,$\cap$>, where A is a set whose elements form the domain of the data flow problem (i.e., the inputs and outputs associated with the flow graph nodes), TOP and BOTTOM are distinguished elements of A (symbolizing the best and the worst possible solution to the optimization problem, respectively,) < is a reflexive partial order, and $\cap$ is the associative and commutative "meet" operator, such that for any a,b in A, $a < b \Leftrightarrow a \cap b = a$ $a \cap a = a$ $a \cap b < a$ $a \cap TOP = a$ $a \cap BOTTOM = BOTTOM$ Where the elements of the domain are sets, examples of meet operators are intersection and union. Where the operator is union, TOP would typically be the empty set and BOTTOM the universal set. Where the operator is intersection, TOP would typically be the universal set and BOTTOM the empty set. Intuitively, higher points in the lattice correspond to higher degrees of information.

The input and output to a node Y are elements of A. A transfer function (FIG. 2) operates on the input to a node Y to determine the output of the node Y. More specifically, F is a set of transfer functions such that F is a subset of {f: A->A}. That is, any function in F has A as its domain and its range. This sell includes the identity function I (which, applied to the input of a node, produces output identical to the input), and the set is closed under composition and meet. The data flow effect of node Y is described by its transfer function $f_y$ in F. The local properties of Y are captured by its transfer function: $OUT_y = f_y(IN_y)$, where $IN_y$ and $OUT_y$ are in A. After a framework has been globally evaluated, each node Y has a solution $OUT_y$ that is consistent with transfer functions at every node. In general, the best computable solution for a data flow framework is the maximum fixed convergence of the equations:

$OUT_{root} = TOP$ $IN_y = \cap(\forall X \text{ in Preds}(Y)) OUT_x$ $OUT_y = f_y(IN_y)$ where Preds(Y) is the set of predecessors of node Y. The solution to the above equations is called the Maximum Fixed Point (MFP) solution. During an evaluation, iterations over the flow graph nodes take place until all node outputs remain unchanged. During such evaluation, $IN_y$ travels down the lattice from TOP to the element that represents the best computable solution prior to Y, regardless of the flow path taken.

In a forward data flow problem, for each node Y, $IN_y$ is defined in terms of the predecessors of Y (as in the equations above). In a backward data flow problem, for each node Y, $IN_y$ is defined in terms of the successors of Y. A data flow problem which is either forward or backward is unidirectional. A data flow problem for which $IN_y$ for each node Y depends on both the predecessors and successors of Y is bidirectional.

The prior art describes a program in terms of a general program model that is also used by this disclosure. This program model consists of a set of one or more external procedures, where an external procedure is one that is not contained (declared) within another procedure but may contain internal procedures nested within it. One of the external procedures is the main procedure. Recursion is allowed; that is, a procedure may directly or indirectly invoke itself.

The containment relationships among the procedures in a program P may be represented as a forest of trees $F_p$, where the nodes of the trees represent procedures/routines. For each external procedure/routine, there is a tree in $F_p$ whose root node represents the external procedure/routine. The variables declared directly within a procedure/routine are local to the procedure/routine, while the variables declared in the ancestors of a procedure/routine in $F_p$ are global to it. The set of variables global to procedure P is denoted GLOBAL(P). Among the local variables of a procedure P are zero or more formal parameters. The set of such variables in P is denoted FORMAL(P). A variable that is either local or global with respect to a procedure P is known to P. An external variable is one that is global to all the procedures of a program. The local variables of a procedure are visible to it; its global variables that are not hidden from it are also visible. The specific mechanism for hiding is irrelevant to our method. One mechanism provided for hiding a global variable is the declaration of a local variable of the same name in an internal procedure.

The prior art includes a model for procedural interaction which is also used in this disclosure. In the model, a statement in a program that invokes a procedure is referred to as a call site. It designates a called procedure, which must he visible to the procedure containing the call site (the calling procedure). For each formal parameter of the called procedure, the call site must designate an argument that is associated with it. An argument may be a reference argument, which is a variable that is visible to the calling procedure and is passed-by-reference to its corresponding formal parameter. When the call site is invoked, a formal parameter that is associated with a reference argument assumes the same address in memory as the argument. Procedures interact at call sites through reference arguments and also through variables that are global to the called procedure. Thus, a call site s is said to pass a variable X to a variable Y if and only if variable Y is the same variable as X and is global to the called procedure, or X is passed-by reference to Y.

Figure 3:
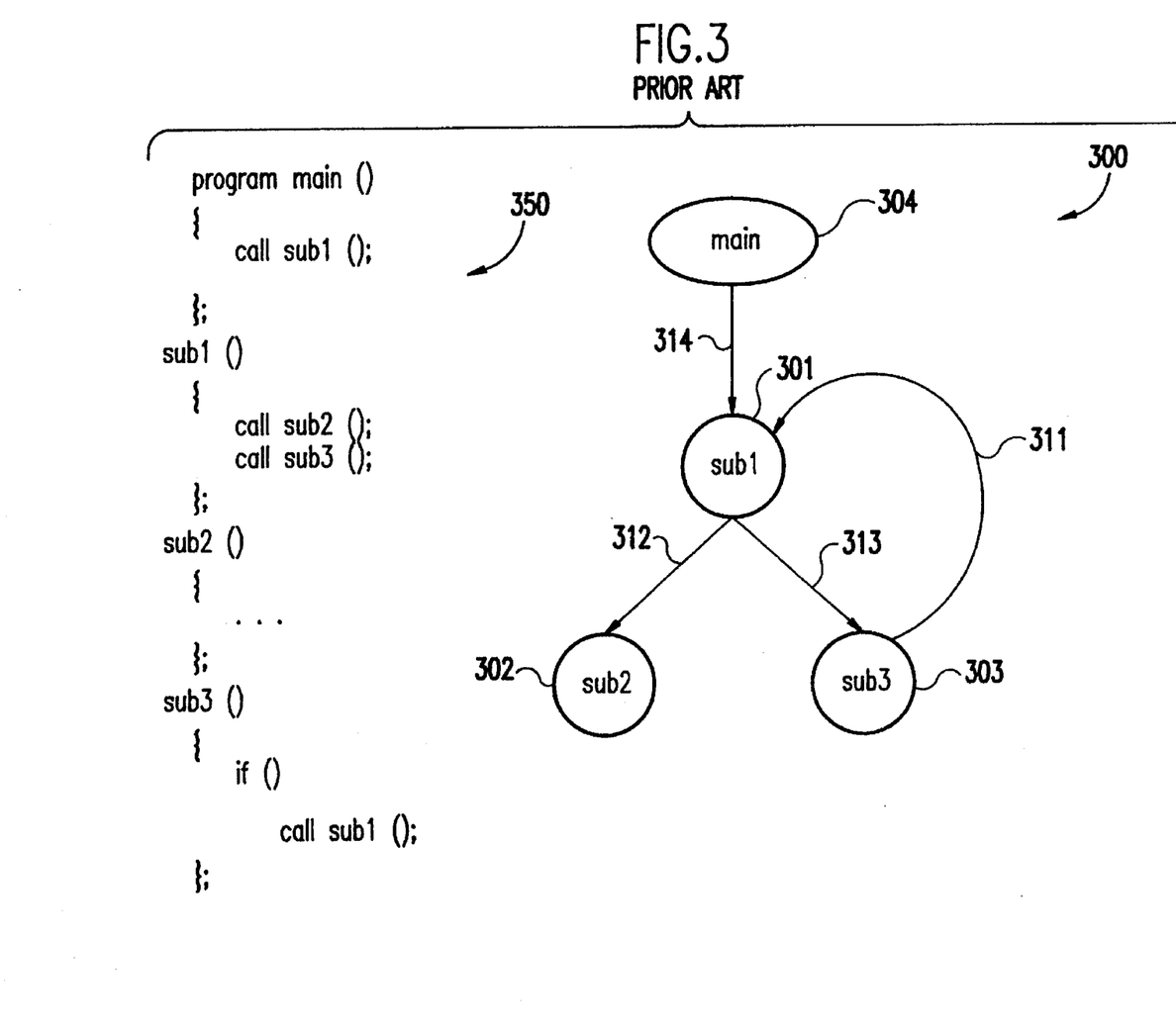
FIG. 3 is a prior art example of a program call graph.

See FIG. 3. The interprocedural structure of a program 350 is represented by a Program Call Graph (PCG) 300, a flow graph for which each procedure is uniquely represented by a single node (301–304) and each call site by a unique edge (311–314). The start node 304 represents the main procedure. The node representing a given procedure/routine P shall be referred to as node P. The edge (P,Q) represents a call site in P that invokes Q. By the definition of a flow graph, it is assumed that every node in the call graph is reachable from the main procedure 304.

In the presence of procedure calls, data flow analysis must make worst case assumptions about the data flow effect of the call unless the analysis is interprocedural; i.e., is performed across procedure boundaries. Worst-case assumptions about interprocedural information inhibit program transformations for optimization or parallelization. Interprocedural data flow analysis algorithms have been developed for various interprocedural problems (Banning, J., "An efficient way to find the side effects of procedure calls and the aliases of variables", *Sixth Annual ACM Symposium on Principles of Programming Languages*, 29–41 (January 1979); Cooper et al., *SIGPLAN '88 Conference on Programming Language Design and Implementation*, 57–66 (June 1988).

Interprocedural data flow analysis may be either flow-sensitive or flow-insensitive. A flow-sensitive analysis makes use of the intraprocedural control flow information associated with individual procedures. A flow-insensitive analysis makes no use of intraprocedural control flow information. By ignoring control flow information, such an analysis does not have to consider the possible paths through a procedure, reducing the cost of the analysis in both space and time. In general, a flow-sensitive algorithm is more precise (i.e., higher in the semilattice) but less efficient in time and space than a flow-insensitive algorithm for the same problem.

Program analysis has struggled with the tradeoff between modularization and optimization in many forms. Interprocedural analysis (IPA) is a well known technique that can be used to bridge the gap across procedure boundaries. The popularity of object oriented languages, such as C++, increases the opportunity for, and the value of, interprocedural analysis and transformations. Constant propagation identifies constant definitions of variables and propagates the constant values to the uses of those objects. Interprocedural constant propagation (ICP) propagates the constant values of variables across procedure boundaries. This may lead to more precise data flow information, which can help improve the precision of other analyses, as well as enable other program transformations to generate more efficient code.

SUMMARY OF THE INVENTION

It is therefore an object of the present invention to provide a flow-sensitive interprocedural constant propagation procedure which finds substantially more constants than previous methods and is efficient in practice.

According to the invention, there is provided a flow-sensitive interprocedural constant propagation method. In addition to the flow-sensitive method, there is described a flow-insensitive algorithm which the flow-sensitive method utilizes when call graph cycles exist. The combination of these two methods enables us to approach the precision of an iterative flow-sensitive interprocedural analysis, without requiring more than one flow-sensitive analysis of each procedure. The algorithms propagate both formal parameters and global variable and are designed to support multiple languages, including C and C++. These algorithms have been implemented in a Fortran 90 research prototype compiler.

BRIEF DESCRIPTION OF THE DRAWINGS

The foregoing and other objects, aspects and advantages will be better understood from the following detailed description of a preferred embodiment of the invention with reference to the drawings, which.

DETAILED DESCRIPTION OF A PREFERRED EMBODIMENT OF THE INVENTION

Figure 4:
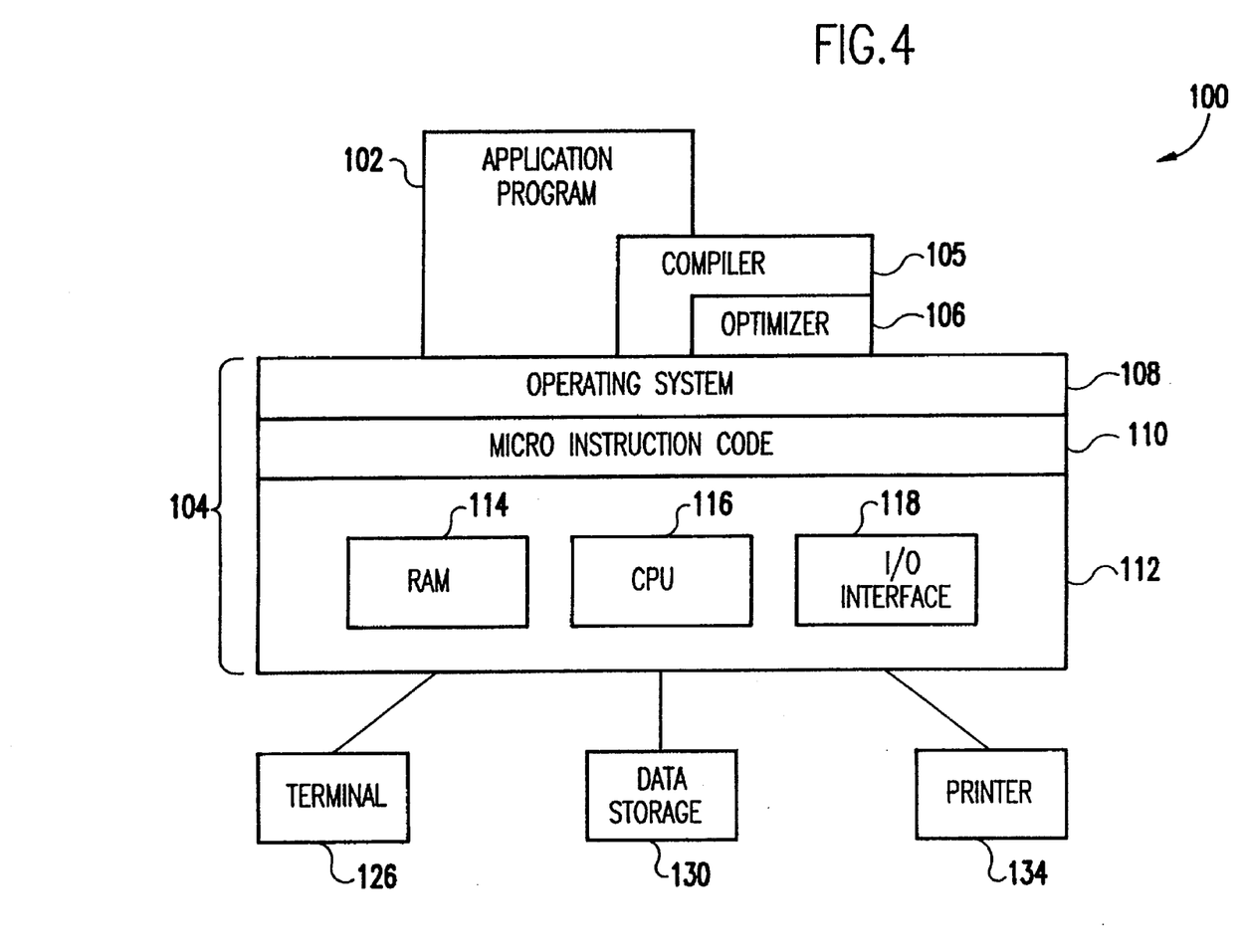
FIG. 4 is a block diagram of a preferred hardware embodiment with a compiler on which the present invention may be implemented.

Referring again to the drawings, and more particularly to FIG. 4, there is shown a block diagram showing a computer system 100 on which a preferred embodiment of the present invention operates. The preferred embodiment includes one or more application programs 102. One type of application program 102 is a compiler 105 which includes an optimizer 106. The compiler 105 and optimizer 106 are configured to transform a source (like an application program 102) program into optimized executable code. More generally, the source program is transformed to an optimized form and then into executable code. A more detailed description of basic concepts of compilers is found in Aho, Sethi and Ullman, supra.

The compiler 105 and optimizer 106 operate on a computer platform 104 that includes a hardware unit 112. The hardware unit 112 includes one or more central processing units (CPU) 116, a random access memory (RAM) 114, and an input/output interface 118. Micro-instruction code 110, for instance a reduced instruction set, may also be included on the platform 104. Various peripheral components may be connected to the computer platform 104 including a terminal 126, a data storage device 130, and a printing device 134. An operating system 108 coordinates the operation of the various components or the computer system 100. An example of computer system 100 like this is the IBM RISC System/6000 (RISC System/6000 is a trademark of the IBM Corporation.) It is readily understood that those skilled in the computer arts will be familiar with many equivalent computer systems 100.

The following code and table illustrate the difference between flow-sensitive and flow-insensitive interprocedural constant propagation for formal parameters.

```
void main(void)
    sub1 (0);

void sub1 (int f1)
    int x,y;
    x=9;
    if (f1==0)
        y=1;
```

-continued

```
    else
        y=0;
    sub2 (y, 4, f1, x);

void sub2 (int f2, int f3, inst f4, int f5)
    ... =f2+f3+f4+f5;
```

TABLE 1

EXAMPLE PROGRAM AND PRECISION COMPARISON

| Method | Formal Parameter Constants |
| --- | --- |
| Flow-Sensitive | f1, f2, f3, f4, f5 |
| Flow-Insensitive | f1, f3, f4 |

By inspecting the call site argument information, noting that the formal parameters are not modified and propagating this information to the called routine, a flow-insensitive algorithm can detect that the values of parameters f1, f3 and f4 are constant. Determining that f2 and f5 are also constant requires an analysis of the intraprocedural control flow of sub1. In particular, x and y must be the same constant on all paths from the entry of sub1 to the call of sub2. Since f1 has the constant value 0, the path containing "y=0" is not executed.

In addition to intraprocedural analysis, the compiler according to the invention performs a number of interprocedural analyses. The compilation model provides an IPA collection phase, during which each procedure in the program is visited and the IPA inputs are collected and saved for later use. This information includes such items as procedure names and formal parameters, procedure call sites and arguments, global variables which are immediately modified or referenced, and an intermediate representation of the procedure. The steps in the compilation model are as follows:

1. Collect interprocedural analysis (IPA) inputs,
2. Construct the program call graph (PCG),
3. Perform interprocedural aliasing (pointer and reference parameter),
4. Compute interprocedural modified (MOD) and reference (REF) information,
5. Perform interprocedural constant propagation (ICP), and
6. Perform reverse topological traversal.

After the complete program has been visited (the model includes a provision for handling missing procedures), the interprocedural analysis phase begins by construction of the program call graph (PCG). An interprocedural alias analysis is then performed, which includes both reference parameter and pointer-induced alias analysis. This is followed by a phase that includes the computation of interprocedural modified (MOD) and reference (REF) information, which is implemented as a flow-insensitive traversal of the PCG. This computation relies on the IPA inputs that are initially collected, as well as previously computed alias information.

Next, interprocedural constant propagation is performed, which uses the interprocedural MOD and REF information along with the IPA inputs. The interprocedural constant propagation consists of two separate steps, the computation of interprocedural constants and the transformation of a program representation to reflect these constants.

The final phase of interprocedural analysis is a reverse topological traversal (backward walk) of the PCG. During this traversal, each procedure (node) is visited once. The intermediate representation of each procedure is first restored to memory if needed, and optional procedure inlining and cloning may be performed. At this stage, the intermediate representation is transformed to reflect the results of interprocedural constant propagation, other traditional analyses and transformations are performed, upward exposed use (USE) is computed and saved, and final code is generated.

The present invention may be characterized as a general method with several specific variants. In the general method, forward, reverse or bidirectional interprocedural data flow analysis is performed over a program call graph (PCG) that supports recursion, while performing only one flow-sensitive analysis of each routine. If the PCG has cycles (back edges), a flow-insensitive data flow solution is precomputed. During the forward and/or reverse traversal of the PCG, a flow-sensitive intraprocedural analysis of each node is interleaved with an interprocedural propagation of the data flow solution values. During the flow-sensitive computation, the precomputed flow-insensitive solution is used for each edge that is a back edge. This permits flow-sensitive interprocedural solution to be obtained in one forward traversal of the PCG for forward data flow problems, in one reverse traversal for reverse data flow problems, and one forward and backward traversal for bidirectional data flow problems.

Figure 5:
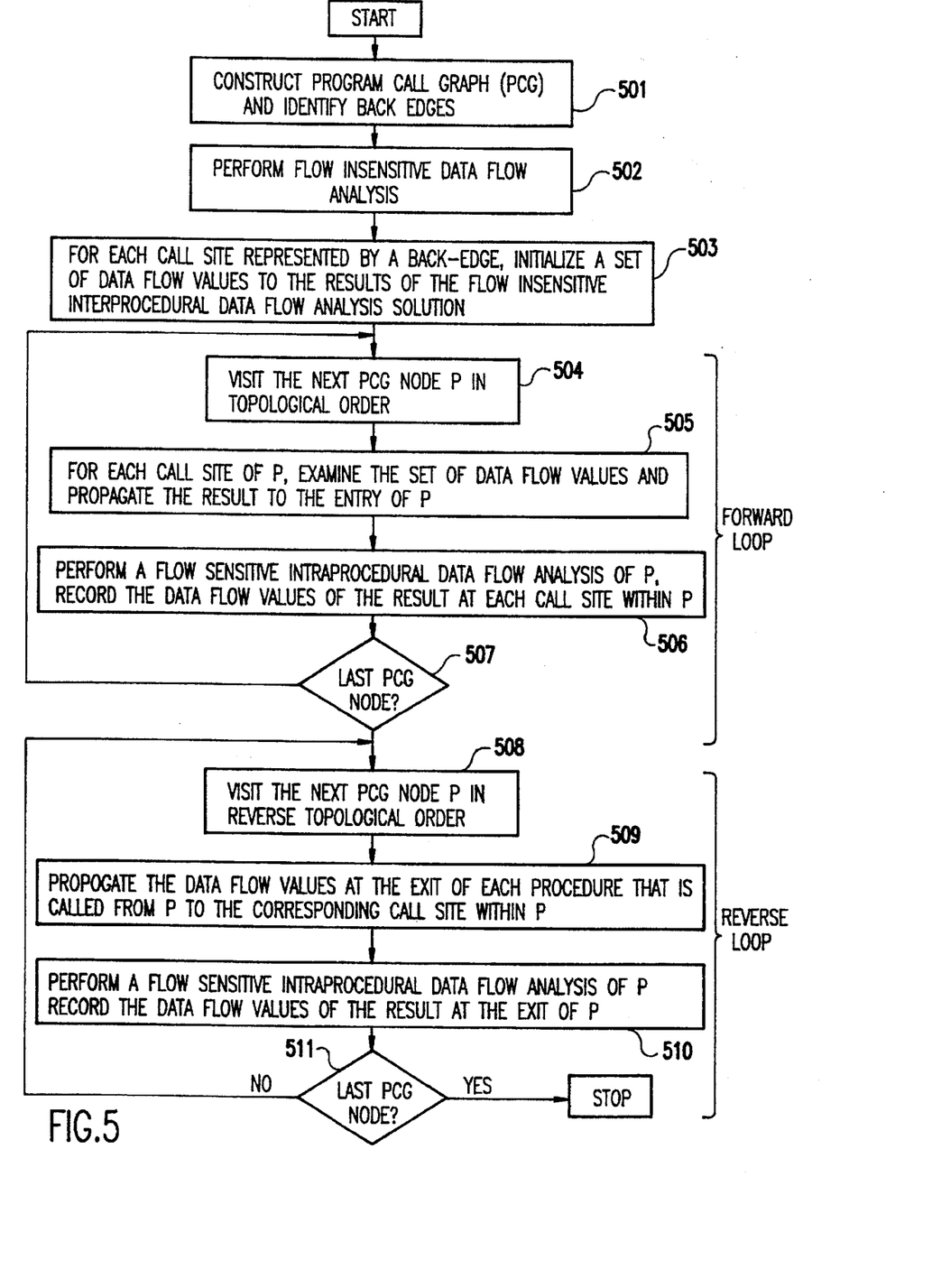
FIG. 5 is a flow diagram of the general method for performing forward or reverse flow-sensitive data flow analysis over the program call graph (PCG) that supports recursion, while performing only one flow-sensitive analysis of each routine, according to the invention.

The general method based on the compilation model is illustrated in FIG. 5. The interprocedural analysis (IPA) inputs are collected and, after the complete program has been visited (the model includes a provision for handling missing procedures), the interprocedural analysis phase begins by constructing the program call graph (PCG) in function block 501. As the PCG is constructed, the back edges are identified. A flow-insensitive interprocedural data flow analysis is then performed in function block 502, if any back edges are identified in function block 501. For each call site represented by a back edge, a set representing a data flow value is initialized to the results of the flow-insensitive interprocedural data flow analysis solution in function block 503. At this point, the procedure enters a forward loop. The first step in the forward loop is to visit the next PCG node P in topological order in function block 504. For each call site of P, the set of data flow values are examined in function block 505, and the result is propagated to the entry of P. A flow-sensitive intraprocedural data flow analysis of P is performed in function block 506. The data flow values are recorded for the result at each call site within P. Then a test is made in decision block 507 to determine if there is another PCG node. If so, the process loops back to function block 504; otherwise, the process enters a reverse loop. The first step in the reverse loop in function block 508 is to visit the next PCG node P in reverse topological order. The data flow values at the exit of each procedure that is called from P to the corresponding call site within P are propagated in function block 509. A flow-sensitive intraprocedural data flow analysis of P is performed in function block 510. The data flow values of the result at the exit of P are recorded. Then, a test is made in decision block 511 to determine if this is the last PCG node. If so, the process loops back to function block 508; otherwise, the process exits.

The analysis methods according to the invention will now be described with respect to specific variants. The implementation of the upward exposed use (USE) algorithm will be first described and then implementations of two variations of interprocedural constant propagation (ICP), flow-insensitive and flow-sensitive, will be described. The flow-insensitive and flow-sensitive algorithms are described propagating constants in the forward direction. Then the flow-sensitive algorithm is extended to propagate returned constants in the backward direction.

Figure 6:
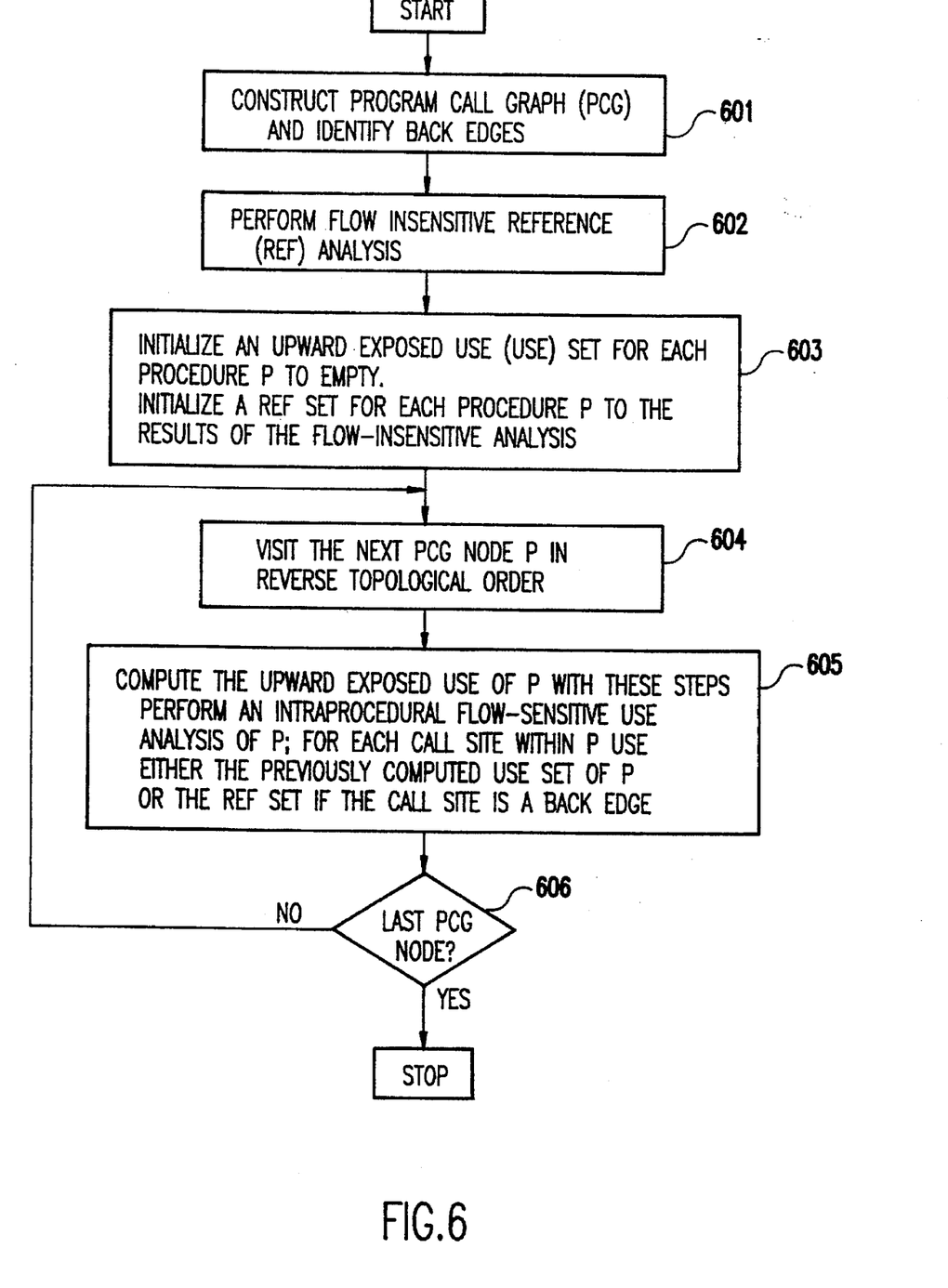
FIG. 6 is a flow diagram of the procedure for computing upward exposed use (USE) according to the invention.

The upward exposed use (USE) process is illustrated in FIG. 6 and begins by constructing a program call graph (PCG) and identifying the back edges in function block 601. Next, a flow-insensitive reference (REF) analysis is performed in function block 602. Prior to entering the processing loop, an upward exposed use (USE) set is initialized for each procedure P to empty in function block 603. The REF set is also initialized to the results of the flow-insensitive analysis in function block 602 for each procedure P. At this point the processing loop is entered. The first step in the loop is to visit the next PCG node P in reverse topological order in function block 604. For that node, the upward exposed use (USE) set of P is computed in function block 605 with the following steps:

perform an intraprocedural flow-sensitive definition-use (def-use) analysis of P, and for each call site within P, use either the previously computed USE set of P or the REF set if the call site is a back edge.

A test is then made in decision block 606 to determine if the last PCG node has been processed. If not, the process loops back to function block 604 to process the next node; otherwise, the process ends.

During the reverse topological traversal of the PCG, upward exposed, use information (USE) is computed and saved. A variable is upwards-exposed with respect to a procedure P if and only if, along some path in P, it is used prior to redefinition. A variable is upwards exposed with respect to a call site if and only if the variable is upwards exposed with respect to the called procedure. See, for example, John Banning, supra. As a procedure (node) is visited, the USE set for a call site can be computed from the previously computed USE set of its called procedure (or from the REF set computed for the procedure where the USE set of the called procedure has not yet been computed for a call site along a back edge). Given the USE sets of its call sites, the computation of USE for the procedure during the definition-use (defuse) analysis of the procedure is known in the prior art. Aho, Sethi and Ullman, supra, describe the defuse analysis at pp. 632, 633. The PTRAN algorithm described by Frances Allen, Michael Burke, Phillippe Charles, Ron Cytron, and Jeanne Ferrante in "An overview of the ptran analysis system for multiprocessing", *Journal of Parallel and Distributed Computing*, 5(5):617–740, 1988, computed USE for formal parameters and globals in the same manner as the present invention, but does not support recursion.

The interprocedural constant propagation (ICP) method (flow-insensitive or flow-sensitive) may optionally be performed. If interprocedural constants are identified, these constants are propagated to the entry point of the procedure where they are constant during the backward walk of the compiler. This propagation is equivalent to adding an assignment statement for each constant variable to the beginning of the procedure where it is constant. Assignment statements are created only for those variables that are referenced (in the REF set) in that procedure.

Figure 7:
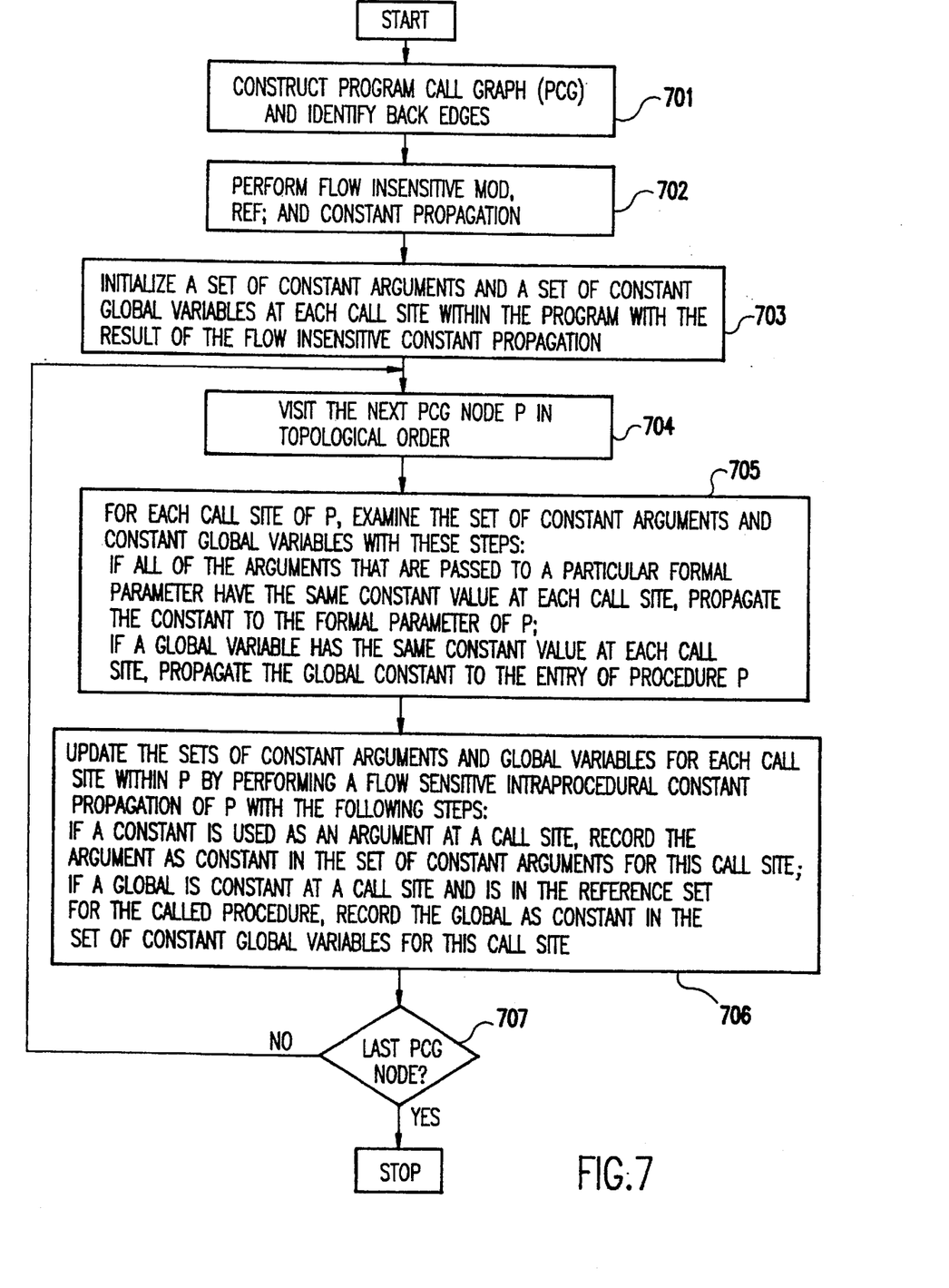
FIG. 7 is a flow diagram of the procedure for computing interprocedural constants (ICP) according to the invention.

The process is shown in FIG. 7, to which reference is now made. The first step is again to construct the program call graph (PCG) and identify the back edges in function block 701. Next, in function block 702, a flow-insensitive modified (MOD), reference (REF) and constant propagation analysis is performed in function block 703. Prior to entering the processing loop, a set of constant arguments and a set of constant global variables are initialized at each call site within the program in function block 703 with the results of the flow insensitive constant propagation from function block 702. The processing loop is entered at function block 704 where the next PCG node P is visited in topological order. For each call site of P, the set of constant arguments and constant global variables are examined in function block 705 with the following steps:

if all of the arguments that are passed to a particular formal parameter have the same constant value at each call site, the constant is propagated to the formal parameter of P, and if a global variable has the same constant value at each call site, the global constant is propagated to the entry of procedure P.

Next, in function block 706, the sets of constant arguments and global variables are updated for each call site within P by performing a flow-sensitive intraprocedural constant propagation of P with the following steps:

if a constant is used as an argument at a call site, the argument is recorded as constant in the set of constant arguments for this call site, and if a global variable is constant at a call site and is in the reference set (REF) for the called procedure, the global variable is recorded as a constant in the set of constant global variables for the call site.

When the flow-sensitive processing has completed for the node, a test is made in decision block 707 to determine if the last node of the PCG has been processed. If not, the process loops back to function block 704; otherwise, the process ends.

In the interprocedural constant propagation (ICP) process illustrated in FIG. 7, the flow-insensitive method is performed in a forward traversal of the PCG, after interprocedural MOD and REF information has been computed in function block 703. For ease of implementation, globals are treated separately from parameters.

The flow-insensitive method for formal parameters is set out in the following code and is an optimistic data-flow algorithm in that all formal parameters are initialized to $\top$. It collects and propagates immediate call site constants to their called procedures. If a formal is found to be constant and is subsequently passed to another formal at a call site without being modified in its procedure (directly or indirectly via any call site), this constant is also propagated, and the relationship between the formals is recorded in a set called $fp_{13}$ bind. To hand cycles in the PCG, a work list is used to keep track of formals that are constant, but are lowered (in the lattice algebra sense) at a later time. When processing a constant argument, if the corresponding formal is $\top$, the formal is marked as constant.

```
procedure meet(formal,new_value)
    orig_value = formal
    formal = formal^new_value
    if orig_value ≠ ⊥ and formal = ⊥ then
        add all f_pk to the worklist, such that
            (formal, f_pk)∈fp_bind
    end if
end meet
procedure insens( )
    /*First process globals*/
    Collect initial constants from block data,
        removing those that are modified in the program
    for each procedure, p, in the program
        for each constant global variable, c
            if p references c, (i.e., c∈Ref(p))
            then
                propagate c into p
            end if
        end loop
    end loop
    /*Then process formal parameters*/
    Initialize formal parameters to ⊤; worklist, and
fp_bind to empty
    for each procedure, p, in the PCG in a forward
        topological traversal
        for each call site, cs, in p
            for each argument, arg, at cs
                let fp1 be the corresponding formal parameter in the
                    called procedure
                if arg is an immediate constant or a global constant
                    meet (fp1, arg)
                else if arg is a formal parameter of p, fp0, that is
                    currently marked as constant and is not modified
                    (directly or indirectly) by p add (fp0,fp1) to
                    fp_bind meet(fp1,fp0)
                else
                    meet(fp1,⊥)
                end if
            end loop
        end loop
    end loop
    /*Pairs on the worklist represent pass-through formal parameters
        that were constant and then were lowered to ⊥*/
    while worklist is not empty
        remove (fp1,fp2) pair
        if fp2 is not ⊥ item
            set fp2 to ⊥
            add all fpk to the worklist, such that
                (fp2,fpk)∈fp_bind
        end if
    end loop
end insens
```

The flow-insensitive algorithm for global variables implemented in the above code identifies global constants by visiting any global initializations (i.e., Fortran block data) and recording those variables that are initialized to a constant on a list. Global variables that are modified anywhere in the program (i.e., those on the procedure MOD list for the main procedure) are removed from this list. The remaining variables on the list are constant for the entire program. These global constants are propagated to every procedure, but constant definitions are only created for a variable that is immediately referenced in a procedure.

Allen, Burke, Charles, Cytron, and Ferrante, supra, describe a flow-insenstive interprocedural algorithm for constant propagation of formal parameters, based on the bindings of formal parameters. It detects immediate argument constants and the transitive effect of passing their corresponding parameters as arguments. They do not handle returned constants, and their program model does not support recursion.

The flow-insensitive method is similar to the "pass-through" parameter forward jump function method described by David Callahan, Keith D. Cooper, Ken Kennedy, and Linda Torczon in "Interprocedural constant propagation", *SIGPLAN '86 Symposium on Compiler Construction*, pp. 152–161, July 1986, and Dan Grove and Linda Torczon in "Interprocedural constant propagation: A study of jump function implementations", *SIGPLAN 93 Conference on Programming Language Design and Implementation*, pp. 90–99, June 1993. They differ in that the pass-through method applies a flow-sensitive intraprocedural constant jump function before the interprocedural solution is computed. Thus, the pass-through method may identify more constants to interprocedurally propagate. The flow-insensitive method according to the invention defers the application of the intraprocedural constant propagation routine until the backward traversal of the PCG, just prior to code generation.

The flow-sensitive constant propagation algorithm makes use of a flow-sensitive intraprocedural method. Although any intraprocedural method can be employed, the preferred implementation uses the SCC algorithm of Wegman and Zadeck, described in "Constant propagation with conditional branches", *ACM Trans. on Programming Languages and Systems*, 13(2):181–210, 1991. This is an optimistic algorithm that discards unreachable code during the propagation, which may permit the identification of additional constants. The flow-sensitive method is performed in one forward traversal of the PCG, after procedure MOD and REF information have been computed. This processing of the PCG includes the performance of intraprocedural constant propagation as each procedure is visited. A major characteristic of this algorithm is the interleaving of the intraprocedural and interprocedural phases. This algorithm is similar to ones previously described for interprocedural data flow analysis described by Frances E. Allen in "Interprocedural data flow analysis", *Proc. IFIP Congress 74*, pp. 398–402, 1974, and interprocedural alias analysis described by Jong-Deok Choi, Michael Burke and Paul Carini in "Efficient flow-sensitive interprocedural computation of pointer-induced aliases and side effects", *20th Annual ACM SIGACT-SIGPLAN Symposium on the Principles of Programming Languages*, pp. 232–245, January 1993, and Michael Burke, Paul Carini, Jong-Deok Choi, and Michael Hind in "Flow-insensitive interprocedural alias analysis in the presence of pointers", Lecture Notes in Computer Science, K. Pingali, U. Banerjee, D. Gelernter, A. Nicolau, and D. Padua, editors, pp. 234–250, Springer-Verlag, 1995.

As a flow-sensitive intraprocedural analysis can be expensive, it is only performed once per procedure; i.e., there is no iteration during the flow-sensitive analysis. If a PCG has cycles (back edges), then an optimistic flow-sensitive interprocedural algorithm with one iteration of the PCG could give an incorrect solution. We address this issue by performing a flow-insensitive analysis prior to the flow-sensitive analysis, only if there are cycles in the PCG. During the flow-sensitive analysis, if a call site edge has not been processed before the called procedure (i.e., it is a back edge), we use the solution obtained by the flow-insensitive interprocedural constant propagation method for this edge. We use this same method to compute procedure USE information in one reverse topological traversal of the PCG, where REF information is used for back edges. The code for the flow-sensitive algorithm for formal parameters and global variables is set out below:

```
perform insens for formal parameters, recording the
    constant status of each argument
initialize all formal parameters to T
collect initial constants from block data as an imaginary call to main
for each procedure, p, in a forward topological traversal of the PCG
    for each call site of p
        if all arguments corresponding to a particular formal parameter
            of p are the same constant
                propagate the constant to the formal
parameter of p
        end if
        if a global is the same constant on each
call of p
                propagate the global constant to p
        end if
        /*Use flow-insensitive information if a calling procedure has
            not been processed*/
```

```
        end loop
        perform a flow-sensitive intraprocedural
constant propagation on p
        if a constant is used as an argument
            record the argument as constant
            /*This will discard the flow-insensitive solution for this
                argument*/
        end if
        if a global constant at a call site is in the Ref set for the called
            procedure then record the global as constant at this call
site
        end if
end loop
```

Global variables are handled in a similar manner. The method first examines block data and identifies the variables that are assigned constant values by entering them on a list. This list is then provided as input to the intraprocedural constant propagation algorithm for the entry point of the main procedure. The intraprocedural algorithm propagates global constants to call sites. If the global variable is referenced in the called procedure, or in any procedure which is called by that procedure, it is propagated interprocedurally. This is determined from the procedure REF information. (The flow-sensitive procedure USE information has not yet been computed.) The referenced variable is then added to the list of constants for that call site. When a procedure is processed, the list of constants for each call site that invokes the procedure is inspected, and a meet is performed. If a back edge exists, the flow-insensitive global solution for the back edge is used.

The ratio of the number of back edges to the total number of edges can be used as a measure of the "flow-insensitivity" of our solution. When this ratio is zero, i.e., no back edges exist, the same results as a flow-sensitive iteration solution (that does not propagate returned constants) are achieved, without requiring iteration. As the ratio of back edges to forward edges approaches one, more flow-insensitive information is utilized. In the limit that all edges are back edges and the ratio is one, the flow-sensitive method achieves the same results as the flow-insensitive solution. For intermediate ratio values, a result is achieved which is between the two limiting solutions. Even though we adopt a more conservative flow-insensitive solution for back edges, our method still benefits from a flow-sensitive intraprocedural analysis of each procedure.

Figure 8A:
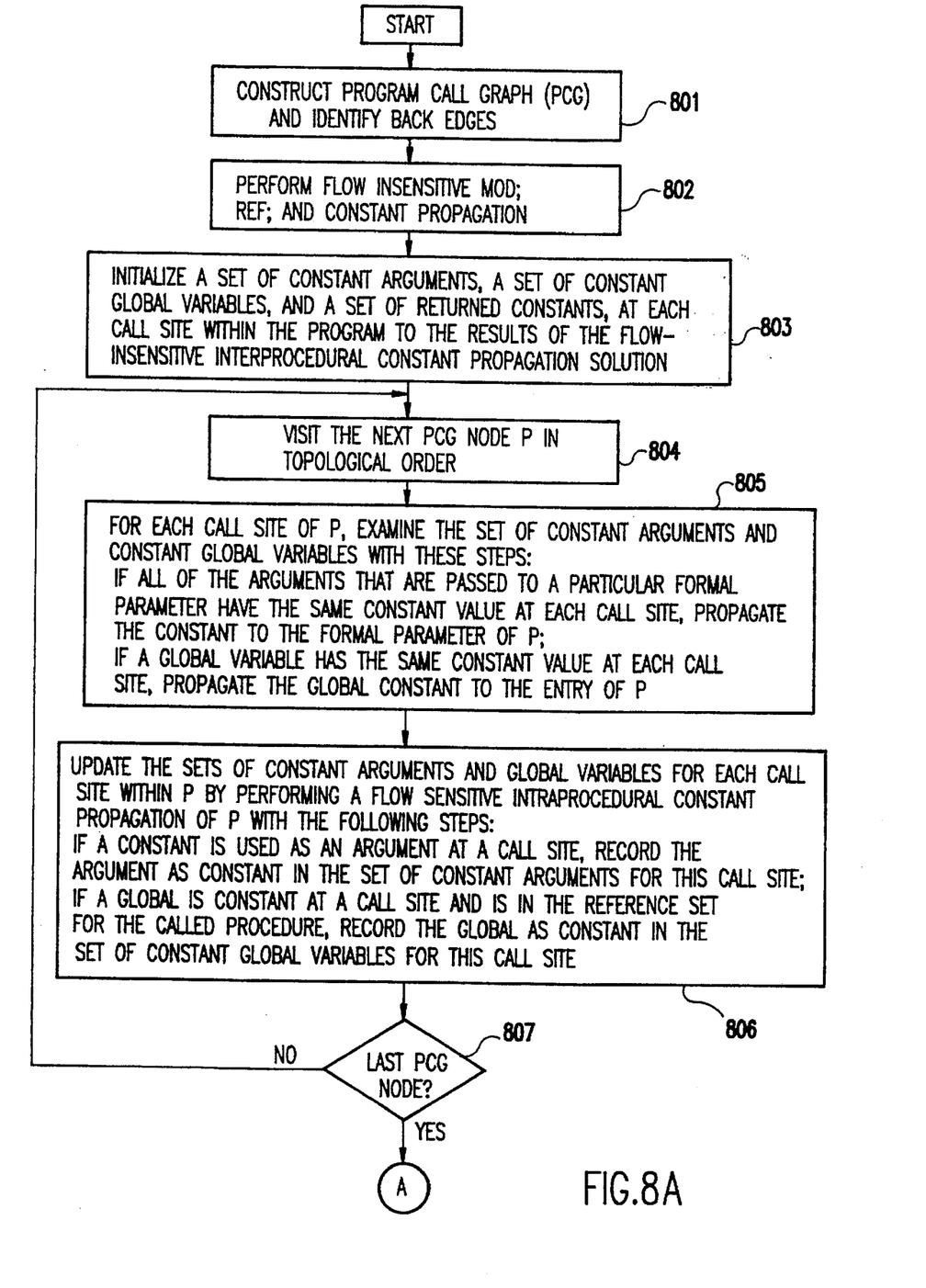
FIGS. 8A and 8B, taken together, are a flow diagram of the procedure for computing interprocedural constants with returned constants (RETURNS) according to the invention.
Figure 8B:
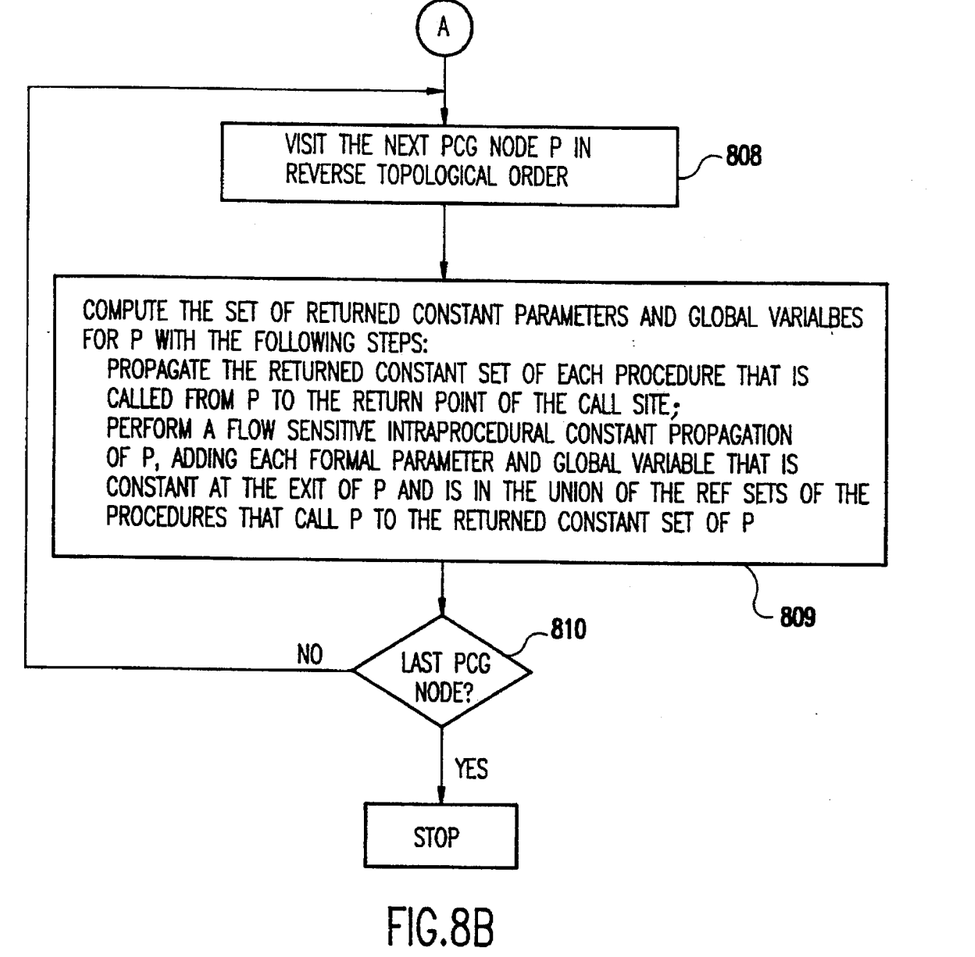

Returned constants can be accommodated by extending the flow-sensitive method according to the invention to include one additional topological traversal of the PCG which is performed in the reverse direction. The procedure is illustrated in FIG. 8. The first step is to construct the program call graph (PCG) and identify the back edges in function block 801. Then, a flow-insensitive modified (MOD), reference (REF) and constant propagation is performed in function block 802. Prior to entering the processing loop, a set of constant arguments, a set of constant global variables and a set of returned constants are initialized at each call site within the program in function block 803 to the result of the flow-insensitive interprocedural constant propagation solution of function block 802. The first step in the processing loop in function block 804 is to visit the next PCG node P in topological order. Then, in function block 805, for each call site of P, the set of constant arguments and constant global variables are examined with the following steps:

if all of the arguments that are passed to a particular
    formal parameter have the same constant value at each
    call site, the constant is propagated to the formal
    parameter of P, and if a global variable has the same constant value at each call site, propagate the global constant to the entry of P. Next, in function block 806, the sets of constant arguments and global variables are updated for each call site within P by performing a flow-sensitive intraprocedural constant propagation of P with the following steps:

if a constant is used as an argument at a call site, the argument is recorded as constant in the set of constant arguments for the call site, and if a global variable is constant at a call site and is in the reference (REF) set for the called procedure, the global variable is recorded as constant in the set of constant global variables for the call site.

A test is then made in decision block 807 to determine if the last PCG node has been processed. If not, the process 1pops back to function block 804; otherwise, a second processing loop is entered, the first step of which is to visit the next PCG node P in reverse topological order in function block 808. In function block 809, the set of returned constant parameters and global variables for P are computed with the following steps:

the returned constant set of each procedure that is called from P is propagated to the return point of the call site, and a flow-sensitive intraprocedural constant propagation of P is performed by adding each formal parameter and global variable that is constant at the exit of P and is in the union of the REF sets of the procedures that call P to the returned constant set of P.

A test is then made in decision block 810 to determine if the last PCG node has been processed. If not, the process loops back to function block 808; otherwise, the process ends.

As seen from FIG. 8, during the traversal of the PCG, a second flow-sensitive intraprocedural analysis of each procedure is performed to identify the procedure's set of returned constant formal parameters and global variables that are propagated to the invoking call site. A flow-insensitive solution is also precomputed and used for back edges in this traversal. This enhancement is illustrated in the following code and can be performed immediately after the algorithm given for the flow-sensitive ICP for formal parameters and global variables:

```
for each procedure, p, in PCG
    perform a flow-insensitive intraprocedural constant propagation on
        p, initializing the returned constant set of p to the formal
        parameters and global variables that are constant at every exit
        point of p
end loop
for each procedure, p, in reverse topological traversal of the PCG
    perform a flow-sensitive intraprocedural
constant propagation on p
        for each call site, use the retuend constant set computed for
            the called procedure
            /*Use flow-insensitive information if the called procedure's
            return constant set has not been computed*/
        at the exit of p, add formal parameters and global variables that are
            constant at every exit point of p to the returned constant set of p
end loop
```

If performed in this order, the computation of returned constants can use the constants discovered by the forward traversal. For efficiency, the backward traversal can be performed during the reversal topological traversal in step 6 of the compilation model in a similar manner to the computation of USE.

Consider the following code which extends the original code example above illustrating the difference between flow-sensitive and flow-insensitive constant propagation by including returned constants:

```
void main(void) {             int sub2(int f2, int f3,
    int r1;                       int f4, int f5) {
    r1 = sub1(0);                 ...=f2+f3+f4+f5;
    if(r1==0)                     return f2+f3+f4+f5;
        sub4( );              }
}
int sub1 (int f1) {
    int x, y, r2;             void sub3(int f6) {
    x = 9;                        ...= f6
    if (f1==0)                    .
        y=1;                      .
    else                          .
        y=0;                  }
    r2=sub2(y, 4,             void sub4(void) {
f1,x);                            .
    sub3(r2);                     .
    if(r2>0)                      .
        return 1;             }
    else
        return 0;
}
```

After the forward topological traversal, formal parameters f1–f5 are found to be constant. The reverse topological traversal determines that the returned value from sub2 is constant. This result is used during the second flow-sensitive intraprocedural analysis of sub1, which discovers that the returned value for sub1 is constant. This information can then be used in main, to determine if sub4 is invoked.

Note that this enhancement does not provide the full precision of an iterative solution over the PCG. This is demonstrated by the call to sub3 in sub1. Although the reverse topological traversal determines that r2 is constant, since this occurs after the only forward traversal, sub3 will not benefit from this information. To do so would require an additional forward traversal for this example and full iteration, in general. The table below summarizes the precision of the method according to the invention as well as the return jump function implementation described by Dan grove and Linda Torczon, supra.

TABLE 2

EXAMPLE PROGRAM AND PRECISION COMPARISON

| Method | Formal Parameter Constants | Returned Constants |
|---|---|---|
| Flow-Sensitive | f1, f2, f3, f4, f5 | — |
| Flow-Sensitive with Returned Constants | f1, f2, f3, f4, f5 | r1, r2 |
| Flow-Sensitive (PCG Iteration) | f1, f2, f3, f4, f5, f6 | r1, r2 |
| Polynomial with Returned Constants | f1, f3, f4, f5 | — |

Since the foregoing described the behavior of interprocedural constant propagation, we have tried to distinguish the interprocedural effects from the intraprocedural ones. We measure the number of constant candidates that are interprocedurally propagated at each call site and the number of interprocedural constants that are found to hold at the entry of a procedure. While the second metric is the main focus of the present invention, the first metric is also important. The identification of constant candidates can be useful for other optimizations, such as procedure inlining and cloning. These results include both constant formal parameters and global variables. The metrics eliminate the duplicate counting that can occur if a constant interprocedural value is propagated to a variable that is referenced multiple times within a procedure. A global variable that is propagated to multiple procedures will be counted once for each procedure that it is propagated to.

We only propagate scalar variables, although we have observed that at least one benchmark would benefit from the propagation of constant array values. These results do not include the propagation of returned constants. Our measurements were made on the Fortran subset of the SPECfp92 benchmarks and the 030.matrix300 program from the first SPEC suite. See Michael Hind, Michael Burke, Paul Carini, and Sam Midkiff, "An empirical study of precise interprocedural array analysis", Scientific Programming, 9(3):255–271, 1994, for an analysis of interprocedural aspects of the Fortran subset of the first SPEC suite. The Fortran SPEC benchmarks are all written in Fortran77, which does not support recursion as a language feature. None of these benchmarks have back edges in the PCG.

Table 3 presents one metric, the number of call site constant candidates that are interprocedurally propagated. We report the number of constant actual arguments and the the flow-insensitive method results form the pass-through of constant immediate values, few of which are expected. The flow-sensitive method finds 158 additional constant arguments in six benchmarks, which are 2.9% of the total number of arguments and 24% more than the flow-insensitive method.

In Table 3, the second column that is labeled FI lists the number of global constants that are initiated in a block data subprogram and represents the number of candidates considered for propagation by the flow-insensitive algorithm. The second column that is labeled FS reports the number of global constants that reach the call site and are referenced in the called procedure (directly or indirectly), using the flow-sensitive method. The column labeled Vis reports the number of global constants that are visible in the calling procedure, using the flow-sensitive method.

TABLE 3

INTERPROCEDURAL CALL SITE CONSTANT CANDIDATES

CALL SITE CONSTANT CANDIDATES

| PROGRAM | ARGUMENTS | | | | | | | GLOBALS | | |
|---|---|---|---|---|---|---|---|---|---|---|
| | TOT | IMM | PCT | FI | PCT | FS | PCT | FI | FS | VIS |
| 013.SPICE2G6 | 2983 | 384 | 13% | 384 | 13% | 430 | 14% | 0 | 533 | 302 |
| 015.DODUC | 483 | 39 | 8% | 39 | 8% | 43 | 9% | 0 | 1 | 1 |
| 030.MATRIX300 | 178 | 25 | 14% | 25 | 14% | 110 | 62% | 0 | 0 | 0 |
| 034.MDLJDP2 | 195 | 11 | 6% | 11 | 6% | 11 | 6% | 16 | 69 | 33 |
| 039.WAVE5 | 676 | 30 | 4% | 32 | 5% | 49 | 7% | 74 | 249 | 231 |
| 048.ORA | 0 | — | | — | | — | | 16 | 7 | 7 |
| 077.MDLJSP2 | 195 | 11 | 6% | 11 | 6% | 11 | 6% | 0 | 0 | 0 |
| 078.SWM256 | 0 | — | | — | | — | | 0 | 0 | 0 |
| 089.SU2COR | 644 | 110 | 17% | 110 | 17% | 110 | 17% | 0 | 0 | 0 |
| 090.HYDRO2D | 197 | 28 | 14% | 28 | 14% | 28 | 14% | 0 | 1 | 1 |
| 093.NASA7 | 104 | 33 | 32% | 33 | 32% | 45 | 43% | 0 | 3 | 3 |
| 094.FPPPP | 103 | 17 | 17% | 17 | 17% | 21 | 20% | 0 | 3 | 4 |
| TOTAL | 5758 | 688 | 11.9% | 690 | 12.0% | 858 | 13.9% | 106 | 871 | 587 | number of constant global candidates for each method. The first column reports the total number of arguments in each program. The column labeled IMM reports the number of immediate or literal constant arguments. The first column that is labeled FI reports the number of arguments found to be constant by the flow-insensitive interprocedural method. The first column that is labeled FS reports the number of arguments found to be constant by the flow-sensitive interprocedural method. The adjacent columns report the results as a percentage of the number of arguments. The last row records the totals for all the benchmarks.

The flow-insensitive method only finds two additional constant arguments in one benchmark. Any increase from Table 4 presents a second metric, the number of interprocedurally propagated constants that are found to hold at the entry of a procedure. The column labeled TOT reports the number of formal parameters in each benchmark. The first column that is labeled FI reports the number of formal parameters found to be constant by the flow-insensitive interprocedural method. The first column labeled FS reports the number of formal parameters found to be constant by the flow-sensitive interprocedural method. The adjacent columns report the results as a percentage of the number of formal parameters. The last row records the totals for all of the benchmarks.

TABLE 4

INTERPROCEDURAL PROPAGATED CONSTANTS

INTERPROCEDURAL PROPAGATED CONSTANTS

| PROGRAM | FORMAL PARAMETERS | | | | | GLOBALS | | |
|---|---|---|---|---|---|---|---|---|
| | TOT | FI | PCT | FS | PCT | PROCS | FI | FS |
| 013.SPICE2G6 | 307 | 4 | 1% | 4 | 1% | 120 | 0 | 45 |
| 015.DODUC | 133 | 2 | 2% | 2 | 2% | 41 | 0 | 1 |
| 030.MATRIX300 | 22 | 2 | 6% | 15 | 47% | 5 | 0 | 0 |
| 034.MDLJDP2 | 40 | 3 | 8% | 3 | 8% | 36 | 38 | 40 |
| 039.WAVE5 | 258 | 5 | 2% | 9 | 3% | 79 | 0 | 61 |
| 048.ORA | 0 | — | | — | | 3 | 18 | 23 |
| 077.MDLJSP2 | 40 | 3 | 8% | 3 | 3% | 35 | 0 | 0 |
| 078.SWM256 | 0 | — | | — | | 6 | 0 | 0 |
| 089.SU2COR | 57 | 4 | 7% | 4 | 7% | 25 | 0 | 0 |
| 090.HYDRO2D | 42 | 7 | 17% | 7 | 17% | 40 | 0 | 0 |
| 093.NASA7 | 64 | 15 | 23% | 22 | 34% | 23 | 0 | 0 |
| 094.FPPPP | 70 | 4 | 6% | 7 | 10% | 23 | 0 | 2 |
| TOTAL | 1043 | 49 | 4.7% | 76 | 7.3% | 428 | 56 | 172 |

In order for a formal to be detected as constant, all corresponding arguments must have the same constant value. The flow-insensitive method finds forty-nine constant formal parameters in ten benchmarks, which are 4.7% of the total. The flow-sensitive method finds seventy-six constant formal parameters, which are 7.3% of the total. The flow-sensitive method finds twenty-seven additional constant formal parameters, in four benchmarks, which are 2.6% of the total number of formal parameters, and 55% more than the flow-insensitive method.

Table 4 also reports the number of global constants interprocedurally propagated by the flow-insensitive and flow-sensitive methods. The column labeled Procs lists the number of procedures in each program that are reachable from the main procedure, including the main procedure. The second column that is labeled FI reports the total number of global constants, found with the flow-insensitive analysis, that occur at the beginning of a procedure and are referenced directly in that procedure. This amounts to a count of the number of constants that are initialized in a block data subprogram and not defined elsewhere in the program. The second column that is labeled FS reports the total number of global constants, found with the flow-sensitive analysis, that occur at the beginning of a procedure and are referenced directly in that procedure.

The flow-insensitive method finds fifty-six global constants in these benchmarks, which is greater than the number of constant formal parameters that it discovers (forty-nine). The flow-sensitive method finds one hundred seventy-two global constants in the same benchmarks, which is more than twice the number of constant formal parameters it discovers. The flow-sensitive method finds more than three times the number of global constants than the flow-insensitive method.

Our metrics are based on the count of the number of interprocedural constants that are propagated to and used by each procedure, rather than counting the total number of constant substitutions. These metrics eliminate possible distortion by counting each interprocedural constant that is propagated to a procedure and referenced, only once, regardless of the number of references within a procedure. Substitutions that arise purely from intraprocedural propagation are not counted. An advantage of this metric is that it is independent of any intraprocedural constant propagation method. It should be understood that our flow-sensitive interprocedural constant propagation method can use any flow-sensitive intraprocedural constant propagation method. The number of constants that are propagated by our flow-sensitive method is dependent on the intraprocedural method used.

Our implementation optionally propagates floating point constants. We have found that the propagation of floating point constants does provide a measurable improvement in the performance of certain programs, including some of the SPEC benchmarks. The results reported include the propagation of floating point as well as integer constants.

We have also measured the compilation time for both of our interprocedural constant propagation methods. The flow-sensitive method increases the analysis phase of the compilation by 50% over the flow-insensitive method. This result is consistent over all of the benchmarks. Since the analysis phase contributes only a small fraction of the overall compilation time, the increase in the overall compilation time is typically small (<1%).

The invention provides a flow-sensitive algorithm for performing interprocedural constant propagation. The algorithm supports recursion, while only performing one flow-sensitive analysis for each routine. Experimental results show that this method finds more constants than previous methods and is efficient in practice. The flow-sensitive algorithm can be extended to propagate returned constants. New metrics are introduced for evaluating interprocedural constant propagation algorithms which are based on the constant values that are interprocedurally propagated. The number of call site candidates and interprocedural constants provide better indications of the success achieved by ICP. These metrics are used to provide both integer and floating point measurements of the SPEC benchmarks for the algorithms implemented by the invention.

While the invention has been described in terms of a general method with several variants, those skilled in the art will recognize that the invention can be practiced with modification within the spirit and scope of the appended claims.

Having thus described our invention, what we claim as new and desire to secure by Letters Patent is as follows:

1. In a computer processor executing a computer compiler, a computer implemented method for performing interprocedural data flow analysis over a program call graph (PCG) that supports recursion, while performing only one flow-sensitive analysis of each routine, comprising the steps of:

a. constructing the PCG of a computer application program, the PCG having a plurality of PCG nodes and PCG edges, each PCG node representing a procedure P in the computer application program and each PCG edge representing a procedure call site and connecting two nodes, a procedure call site being a statement in a program that invokes a procedure, a source node being a calling PCG node and a target node being a called PCG node and a PCG edge having a direction from the calling node to the called node, and some of the edges possibly being back edges;

b. identifying any back edges of the PCG;

c. performing a flow-insensitive interprocedural data flow analysis if there are back edges of the PCG;

d. for each call site represented by a back edge, initializing a set representing a data flow value to the results of the flow-insensitive interprocedural data flow analysis solution of step c;

e. for each procedure P in the PCG, performing a forward or reverse topological traversal of the PCG and, for each call site that invokes P, examining the set of data flow values and propagating the result to an entry of P; and f. performing a flow-sensitive intraprocedural data flow analysis of P without iteration and recording data flow values of the result at each call site within P.

2. In a computer processor executing a computer compiler, a computer implemented method for performing interprocedural data flow analysis over a program call graph (PCG) that supports recursion, while performing only one flow-sensitive analysis of each routine, comprising the steps of:

a. constructing the PCG of a computer application program, the PCG having a plurality of PCG nodes and PCG edges, each PCG node representing a procedure P in the computer application program and each PCG edge representing a procedure call site and connecting two nodes, a procedure call site being a statement in a program that invokes a procedure, a source node being a calling PCG node and a target node being a called PCG node and a PCG edge having a direction from the calling node to the called node, and some of the edges possibly being back edges;

b. identifying any back edges of the PCG;

c. performing a flow-insensitive interprocedural data flow analysis if there are back edges of the PCG;

d. for each call site represented by a back edge, initializing a set representing a data flow value to the results of the flow-insensitive interprocedural data flow analysis solution of step c;

e. for each procedure P in the PCG, performing the following steps in a forward topological traversal of the PCG:

e1. for each call site that invokes P, examining the set of data flow values and propagating the result to an entry of P, and e2. performing a flow-sensitive intraprocedural data flow analysis of P and recording data flow values of the result at each call site within P;

f. when the forward topological traversal of the PCG is completed, then for each procedure P, performing the following steps in a reverse topological traversal of the PCG:

f1. propagating the data flow values at an exit of each procedure that is called from within P to the corresponding call site within P, and f2. performing a flow-sensitive intraprocedural data flow analysis of P and recording the data flow values of the result at the exit of P.

3. In a computer processor executing a computer compiler, a computer implemented method for determining upward exposed use (USE) for a computer program application which comprises the steps of:

a. constructing a Program Call Graph (PCG) of the computer program application, the PCG having a plurality of PCG nodes and edges, each PCG node representing a procedure P in the computer program and each PCG edge representing a procedure call site and connecting two PCG nodes, a procedure call site being a statement in a program that invokes a procedure, a source node being a calling PCG node and a target node being a called PCG node and a PCG edge having direction from the calling node to the called node, and some of the edges possibly being back edges;

b. computing a set of variables that are in a Reference set (REF) for each procedure through a flow-insensitive interprocedural REF analysis of the program application;

c. computing the upward exposed use (USE) of a procedure for each procedure, P, in a reverse topological order with the following steps:

c1. computing the USE set for P by performing an introprocedural flow-sensitive def-use analysis of procedure P, providing for each call site within P either the previously computes USE set for the called procedure or the REF set computed in step b for the called procedure where the USE set of the called procedure has not yet been computed; and c2. noting that the USE set has been computed for procedure P and recording the computed USE set for P so that it is available during the flow-sensitive intraprocedural def-use analysis of each call site where procedure P is called.

4. In a computer processor executing a computer compiler, a computer implemented for determining interprocedural constants for a computer program application which comprises the steps of:

a. constructing a Program Call Graph (PCG) of the computer program application, the PCG having a plurality of PCG nodes and edges, each PCG node representing a procedure P in the computer program and each PCG edge representing a procedure call site and connecting two PCG nodes, a procedure call site being a statement in a program that invokes a procedure, a source node being a calling PCG node and a target node being a called PCG node and a PCG edge having a direction from the calling node to the called node, and some of the edges possibly being back edges;

b. initializing a set of arguments and a set of global variables that are constant at each call site within the program with results of a flow-insensitive interprocedural constant propagation analysis;

c. computing constant formal parameters and global variables for each procedure, P, in topological order, by c1. examining the set of constant arguments and constant global variables for each call site that invokes P with the following steps using sets initialized by the flow-insensitive solution for back edges when a flow-sensitive solution is not available:

c11. if all of the arguments that are passed to a particular formal parameter P have the same constant value at each call site that invokes P, propagate the constant to the formal parameter at the entry of procedure P;

c12. if a global variable has the same constant value at each call site that invokes P, propagate the global constant to the entry of procedure P;

c2. performing a flow-sensitive intraprocedural constant propagation of P, with the following steps, updating the sets of constant arguments and global variables that were initialized with the flow-insensitive solution:

c21. if a constant is used as an argument, record the argument as constant in the set of constant arguments for this call site within procedure P;

c22. if a global constant at a call site is in the Reference set for the called procedure, then record the global constant as constant in the set of constant global variables for this call site within procedure P.

5. In a computer processor executing a computer compiler, a computer implemented method for determining interprocedural constants for a computer program application which comprises the steps of:

a. constructing a Program Call Graph (PCG) of the computer application, the PCG having a plurality of PCG nodes and PCG edges, each PCG node representing a procedure P in the computer program and each PCG edge representing a procedure call site and connecting two PCG nodes, a procedure call site being a statement in a program that invokes a procedure, a source node being a calling PCG node and a target node being a called PCG node and a PCG edge having a direction form the calling node to the called node, and some of the edges possibly being back edges;

b. initializing a set of arguments and a set of global variables that are constant at each call site within the program with results of a flow-insensitive interprocedural constant propagation analysis;

c. initializing the set of returned constants to the flow-insensitive solution;

d. computing the constant formal parameters and global variables for each procedure, P, in topological order by d1. examining the set of constant arguments and constant global variables for each call site that invokes P with the following steps using sets initialized by the flow-insensitive solution for back edges when a flow-sensitive solution is not available:

d11. if all of the arguments that are passed to a particular formal parameter of P have the same constant value at each call site that invokes P, propagate the constant to the formal parameter at the entry of procedure P;

d12. if a global variable has the same constant value at each call site that invokes P, propagate the global constant to the entry of procedure P;

d2. performing a flow-sensitive intraprocedural constant propagation of P with the following steps, updating the sets of constant arguments and global variables that were initialized with the flow-insensitive solution:

d21. if a constant is used as an argument, record the argument as constant in the set of constant arguments for this call site with procedure P;

d22. if a global constant at a call site is in a Reference set (REF) for the called procedure, then record the global as constant in the set of constant global variables for this call site within procedure P;

e. computing the set of returned constant parameters and global variables for each procedure, P, in a reverse topological order with the following steps:

e1. propagating the returned constant set of each procedure that is called from P to the return point of the call site;

e2. performing a flow-sensitive intraprocedural constant propagation of P, adding each formal parameter and global variable that is constant at the exit of procedure P and is in the union of the REF of the procedures that call P to the returned constant set of P.

* * * * *